US006451148B1

(12) United States Patent
Jenner

(10) Patent No.: US 6,451,148 B1
(45) Date of Patent: Sep. 17, 2002

(54) MICROPHONE WIND SHIELD AND METHOD FOR PRODUCTION THEREOF

(75) Inventor: Günter Jenner, Kunstwiesenweg 17, D-76456 Kuppenheim (DE)

(73) Assignee: Günter Jenner, Kuppenheim (DE)

( * ) Notice: Subject to any disclaimer, the term of this patent is extended or adjusted under 35 U.S.C. 154(b) by 148 days.

(21) Appl. No.: 09/610,628

(22) Filed: Jul. 5, 2000

(51) Int. Cl.[7] .......................... B44C 1/17; B32B 11/02; B32B 33/00; B05D 5/00; H04R 1/00

(52) U.S. Cl. ......................... 156/230; 156/72; 156/234; 156/240; 156/244.17; 156/247; 156/277; 156/289; 427/148; 427/200; 427/206; 427/208.2; 428/40.1; 428/90; 428/343.3; 428/914; 381/359

(58) Field of Search ................................ 156/230, 231, 156/234, 238, 239, 240, 241, 244.15, 244.16, 244.17, 247, 277, 289, 72; 427/146, 147, 148, 200, 206, 208.2, 462; 428/90, 914, 42.1, 343; 381/359, 355, 189

(56) References Cited

U.S. PATENT DOCUMENTS 3,528,867 A * 9/1970 Leatherman et al. ........ 156/272
3,886,020 A * 5/1975 Shank, Jr. .................... 156/211
4,035,532 A * 7/1977 Gregorian et al. ............ 428/90
4,389,438 A * 6/1983 Ohtsuki et al. ............... 428/35
4,396,662 A * 8/1983 Higashiguchi ............... 428/90
5,444,790 A 8/1995 Kogen

FOREIGN PATENT DOCUMENTS

DE 19835373 A1 * 2/2000 ........... B23K/26/00
JP 09 095 649 A 4/1997
JP 09 095 657 A 4/1997
JP 09 095 649 8/1997
JP 09 095 657 8/1997

* cited by examiner

*Primary Examiner*—Jerry A. Lorengo
(74) *Attorney, Agent, or Firm*—Paul Vincent

(57) ABSTRACT

A method for disposing a letter sequence onto the outer surface of a microphone wind shield made from foamed material includes the steps of producing at least one letter sequence element on a carrier; positioning the carrier onto the outer surface of the wind shield body by interposing a heat-activating adhesive; applying thermal energy using radiation, in particular, laser beams, for activating the adhesive; and removing the carrier after cooling and solidification of the adhesive. The letter sequence element thereby remains on the outer surface of the wind shield body.

7 Claims, 2 Drawing Sheets

MICROPHONE WIND SHIELD AND METHOD FOR PRODUCTION THEREOF

This application is related to DE 198 35 373.1 filed Aug. 5, 1998 the complete disclosure of which is hereby incorporated by reference.

BACKGROUND OF THE INVENTION

The invention concerns a method for labeling the outer surface of a wind shield body of a microphone made from foamed material and an associated microphone wind shield. The term "labeling" refers not only to letter sequences but also to graphical representations and combinations of both.

Wind related noises can disturb microphones used for reporting or other sound recordings, in particular outside of buildings. Microphones are therefore conventionally provided with a wind shield made in general from a foamed material body, comprising a bore for sliding onto the microphone. The wind shield has been used, for some time, as an information or advertisement carrier in particular for TV reports or interviews. TV companies therefore usually have their logo or name applied to the wind shield so that it is clearly visible in TV broadcasts.

Letter sequences are usually applied to a wind shield body milled from a foamed material block by spraying paint using the screen printing method. It has turned out, however, that highly accurate, fine structures cannot be produced by this method. Moreover, the sprayed paint becomes brittle with time and crumbles away thus rendering the letter sequence unsightly so that the wind shield can no longer be used.

It is the underlying purpose of the invention to introduce a method for applying a letter sequence onto the outer surface of a wind shield of a microphone made from foamed material which permits application of the letter sequence in a long-lasting and highly accurate fashion, and also to provide a corresponding microphone wind shield.

SUMMARY OF THE INVENTION

This object is achieved in accordance with the inventive method by sequentially carrying out the following steps:

producing at least one letter sequence element on a carrier;

positioning the carrier on the outer surface of the wind shield by interposing an adhesive which can be activated by heat;

application of thermal energy using radiation to activate the adhesive; and removing the carrier after the adhesive has cooled and solidified, wherein the letter sequence element remains on the outer surface of the wind shield body.

The invention is based on the idea of not forming the letter sequence during application onto the wind shield body, as in conventional screen printing, but to initially prefabricate the letter sequence on a carrier as a separate structural member. The carrier may be, in particular, a flexible carrier foil or another flat, flexible carrier. If the letter sequence consists of several individual elements, e.g. letters, which have to be accurately positioned with respect to one another, this can be taken into consideration during production of the letter sequence on the carrier to ensure an accurate relative position of the individual letter sequence elements.

The letter sequence element(s) is/are disposed on the carrier such that the surface which is to be connected to the wind shield body is exposed. A heat-activating adhesive is disposed onto this surface, e.g. by spraying. The carrier is then positioned on the outer surface of the wind shield body in such a fashion that the heat-activating adhesive of the letter sequence elements seats on the wind shield body.

Thermal energy is subsequently applied, without contact, for activating the adhesive i.e. using radiation. Towards this end, ordinary heat radiation can be used. However, the thermal energy is preferably applied using laser beams, wherein the laser beams can be guided with high accuracy over the adhesive surface to be heated.

Activation of the adhesive firmly bonds the letter sequence elements to the wind shield body. The letter sequence elements are fixed on the carrier with an adhesive strength which is less than the adhesive strength holding the letter sequence elements on the wind shield body via the heat-activating adhesive. When the carrier is removed after cooling and solidification of the adhesive, the letter sequence elements are detached from the carrier and remain on the outer surface of the wind shield body to thereby form the letter sequence.

Application of thermal energy, in particular using laser beams, generates an activation temperature for the adhesive which should be considerably less than the melting temperature of the foamed material of the wind shield body. The adhesive is preferably heated to between approximately 90° and approximately 100°, thereby reliably preventing damage to the wind shield body.

In a preferred embodiment of the invention, the letter sequence elements are generated and transferred using the so-called flock transfer method. Therein, a melting adhesive is disposed on a fully flocked, flexible flat carrier in correspondence with the configuration of the letter sequence element(s). The melting adhesive glues the flock fibers to form a continuous letter sequence element in correspondence with the configuration in which it is disposed. The adhesive thus produces, on the one hand, a continuous letter sequence element on the completely flocked carrier and on the other hand, can fix the letter sequence element to the wind shield body when subsequently reactivated by the laser beams.

If the letter sequence element comprises only one color, a carrier can be used whose complete surface is flocked in a desired color. Alternatively, the completely flocked carrier can be painted with at least one color before application of the adhesive using, in particular, a screen printing spray. When the pre-fabricated letter sequence consisting of one or more letter sequence elements formed and fixed on the carrier is to be transferred to the wind shield body, the carrier is first positioned and fixed to the outer surface of the wind shield, preferably by means of needles or a heat-resistant adhesive tape. Other removable mounting means are also feasible which can withstand the thermal energy applied by the laser beams.

With respect to the microphone wind shield, the above-mentioned object is achieved in that the letter sequence is glued onto the outer surface of the wind shield body, consisting of foamed material, in the form of a pre-fabricated structural component. Further features of the microphone wind shield can be extracted from the above description of the method.

Further details and features of the invention can be extracted from the following description of an embodiment with reference to the drawing.

DESCRIPTION OF THE PREFERRED EMBODIMENT

Figure 1:
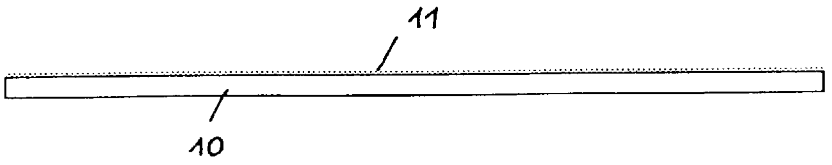
FIG. 1 shows a side view of a flocked carrier in the initial state.
Figure 2:
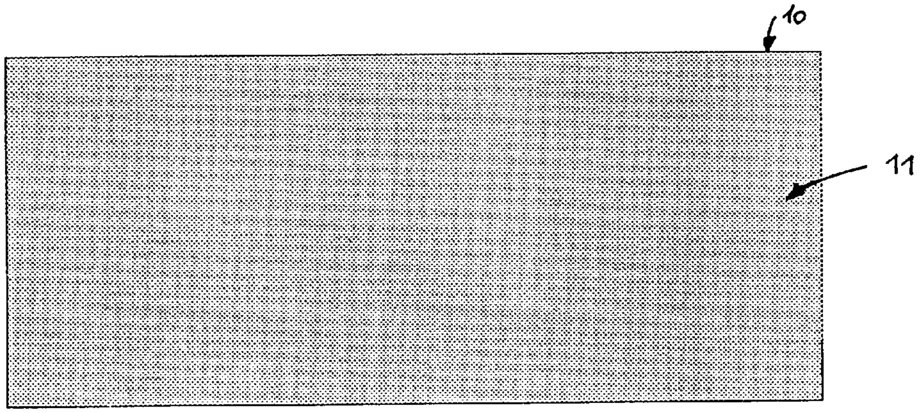
FIG. 2 shows a view onto the carrier in accordance with FIG. 1.
Figure 3:
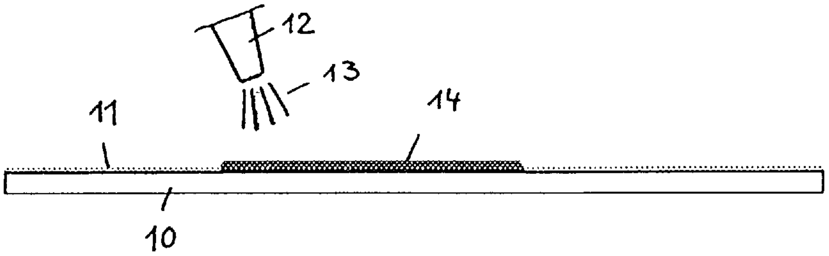
FIG. 3 shows an illustration corresponding to FIG. 1 after application of the adhesive.
Figure 4:
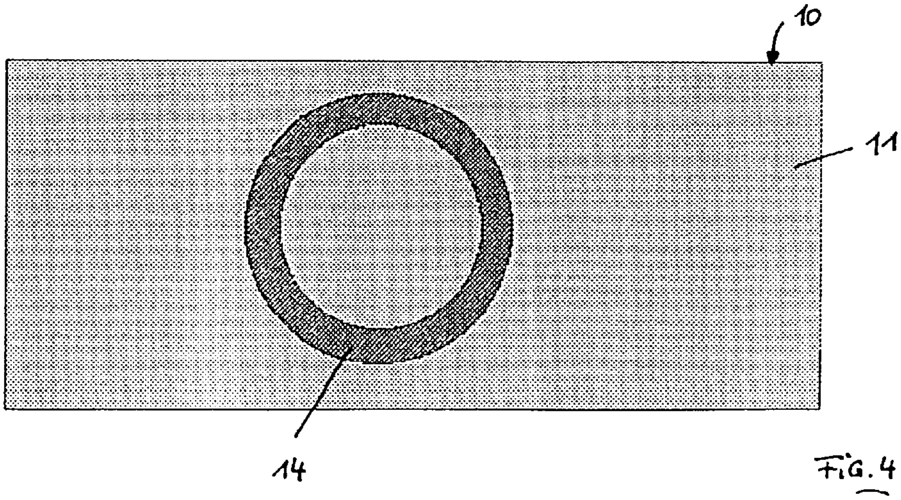
FIG. 4 shows a view onto the carrier in accordance with FIG. 3.

In accordance with FIGS. 1 and 2, the starting material is a foil-like carrier 10 whose one side is completely flocked 11. To form a letter sequence element 14, an adhesive 13 is disposed onto the flocks 11 in a desired predetermined configuration using a nozzle 12. In the embodiment shown, the adhesive 13 is disposed in the shape of a circle (see FIG. 4), thereby forming a letter sequence element 14 in the shape of the letter O. The adhesive disposed onto the flocks 11 bonds the flock fibers in contact therewith to form the uniform letter sequence element 14.

The adhesive can be disposed onto the flocks 11 of the carrier 10 to also form several independent letter sequence elements for generating e.g. a letter sequence.

Figure 6:
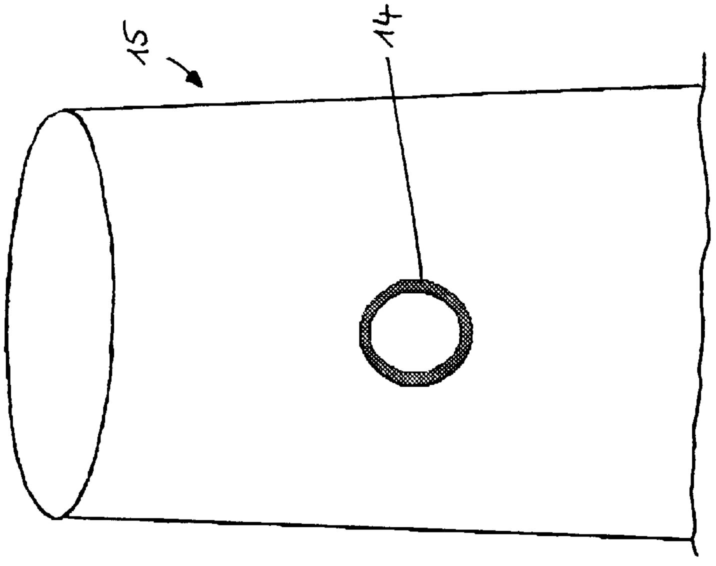
FIG. 6 shows the wind shield body with applied letter sequence.
Figure 5:
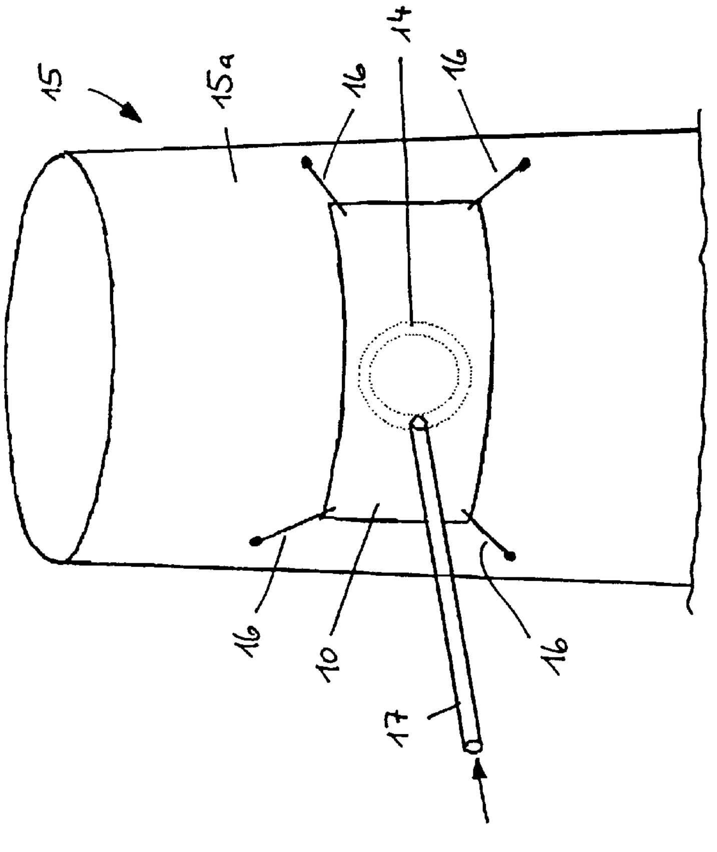
FIG. 5 shows the carrier in a state fixed onto the wind shield body.

When the adhesive forming the letter sequence element 14 has cooled down, the carrier 10 is disposed onto the outer surface 15*a* of a wind shield body 15 consisting of foamed material such that the flocked side bearing the letter sequence element 14 seats on the outer surface 15*a*. Disposed in this position, the carrier 10 is fixed by needles 16 (FIG. 5). Thermal energy is then supplied using laser beams 17 to activate the adhesive forming the letter sequence element 14 such that it bonds to the outer surface 15*a* of the wind shield body 15. The adhesive strength between the outer surface 15*a* and the letter sequence element 14 is greater than the retaining forces of the flocks 11 on the carrier 10. When the carrier 10 is removed after cooling of the adhesive, the letter sequence element 14 therefore remains on the outer surface 15*a* of the wind shield body 15 such that, in the embodiment shown in FIG. 6, the letter O is disposed on the wind shield body 15.

What is claimed is:

1. A method for disposing a letter or graphical element sequence onto a curved outer surface of a microphone wind shield body made from foamed material, the method comprising the steps of:

a) disposing heat activating adhesive onto a flocked, flat, and flexible carrier in a configuration corresponding to at least two letter or graphical sequence elements, said letter or graphical sequence elements having a mutual separation differing from a targeted mutual separation between said elements on the wind shield body;

b) fixing said carrier, in a removable manner, onto the curved outer surface of the wind shield body such that said adhesive presses against and distorts adjacent portions of said curved outer surface;

c) applying thermal energy using radiation for activating said adhesive; and d) removing said carrier after cooling and solidification of said adhesive, wherein said letter or graphical sequence elements remain on the outer surface of the wind shield body with said targeted mutual separation.

2. The method of claim 1, wherein said thermal energy is applied using a laser beam.

3. The method of claim 1, wherein said adhesive is heated to approximately 90° C. to 100° C.

4. The method of claim 1, further comprising disposing at least one coloring agent onto said completely flocked carrier before application of said adhesive.

5. The method of claim 4, wherein said coloring agent is applied via screen printing.

6. The method of claim 1, wherein step b) comprises the step of positioning and fixing said carrier on the outer surface of the wind shield body using one of needles and a heat-resistant adhesive tape.

7. A microphone wind shield made from the following process:

a) disposing heat activating adhesive onto a flocked, flat, and flexible carrier in a configuration corresponding to at least two letter or graphical sequence elements, said letter or graphical sequence elements having a mutual separation differing from a targeted mutual separation between said elements on a wind shield body;

b) fixing said carrier, in a removable manner, onto a curved outer surface of said wind shield body such that said adhesive presses against and distorts adjacent portions of said curved outer surface;

c) applying thermal energy using radiation for activating said adhesive; and d) removing said carrier after cooling and solidification of said adhesive, wherein said letter or graphical sequence elements remain on said outer surface of said wind shield body with said targeted mutual separation.

* * * * *